(12) United States Patent
Kamikubo

(10) Patent No.: US 6,201,626 B1
(45) Date of Patent: Mar. 13, 2001

(54) SCANNING OPTICAL SYSTEM

(75) Inventor: Junji Kamikubo, Tokyo (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/338,577

(22) Filed: Jun. 23, 1999

(30) Foreign Application Priority Data

Jun. 26, 1998 (JP) .................................................. 10-176416

(51) Int. Cl.⁷ .................................................. G02B 26/08
(52) U.S. Cl. .......................... 359/205; 359/196; 359/570
(58) Field of Search .................................... 359/196, 197, 359/205, 212, 570

(56) References Cited

U.S. PATENT DOCUMENTS

| | | |
|---|---|---|
| 5,208,701 | 5/1993 | Maeda . |
| 5,294,945 | 3/1994 | Omura et al. . |
| 5,422,753 | 6/1995 | Harris . |
| 5,486,694 | 1/1996 | Harris . |
| 5,541,760 | 7/1996 | Iizuka . |
| 5,739,940 | 4/1998 | Kondo . |
| 5,796,520 | 8/1998 | Maruyama . |
| 5,838,480 | 11/1998 | McIntyre et al. . |
| 5,940,214 | * 8/1999 | Suzuki et al. ........................ 359/570 |

FOREIGN PATENT DOCUMENTS 827004 3/1998 (EP) .

* cited by examiner

*Primary Examiner*—Darren Schuberg
(74) *Attorney, Agent, or Firm*—Greenblum & Bernstein P.L.C.

(57) ABSTRACT

A scanning optical system is provided with a light source, a deflector, which deflects a beam emitted from said light source, and a scanning lens for converging the beam deflected by the deflector onto a surface to be scanned. The scanning lens has a positive power as a whole, and includes a diffraction lens structure that is formed on at least one surface of one of the lens element. The diffractive lens structure compensates a lateral chromatic aberration caused by the refraction lens elements. The diffraction lens structure satisfies the following condition (1);

$$0.3 \leq m/W \leq 4.0 \qquad (1)$$

where, m is the number of periodic patterns of the diffraction lens structure struck by the incident light beam having the maximum scan angle W (unit: degrees).

22 Claims, 9 Drawing Sheets

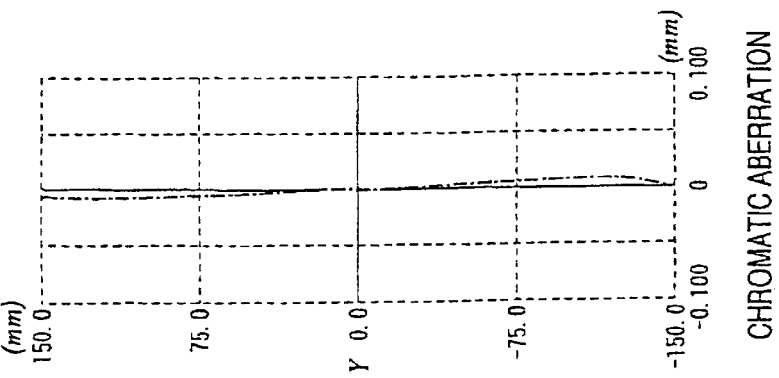
FIG. 4A  FIG. 4B  FIG. 4C
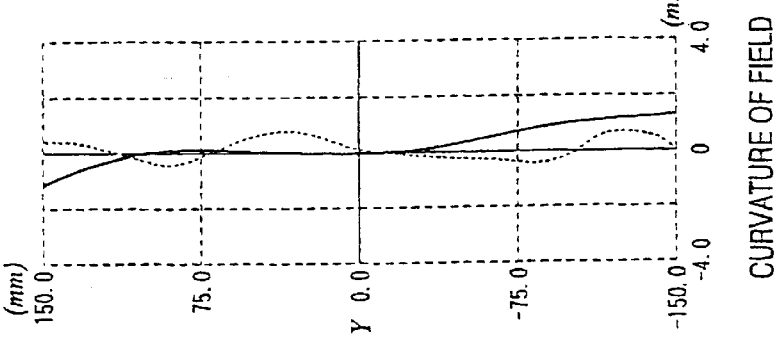
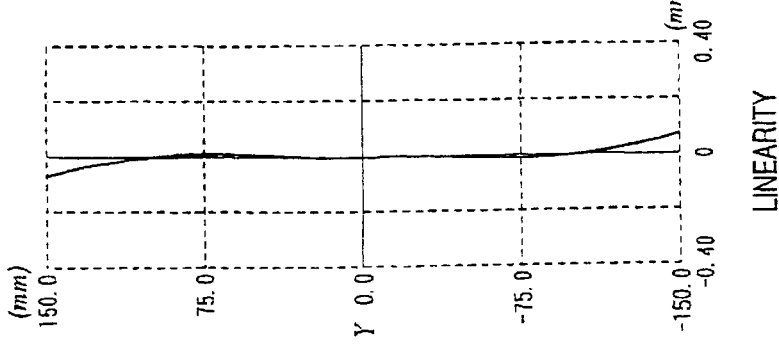

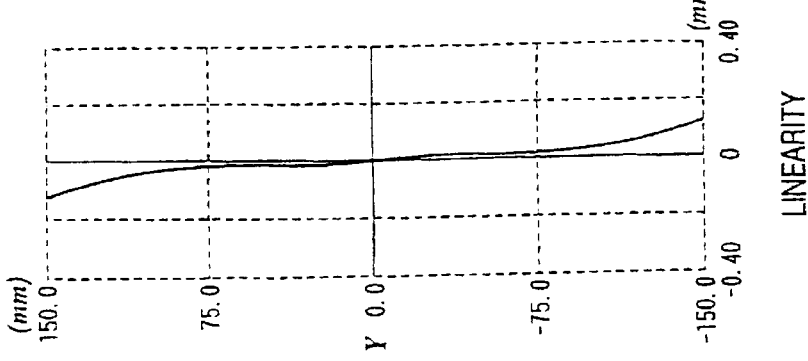
FIG. 5A  LINEARITY
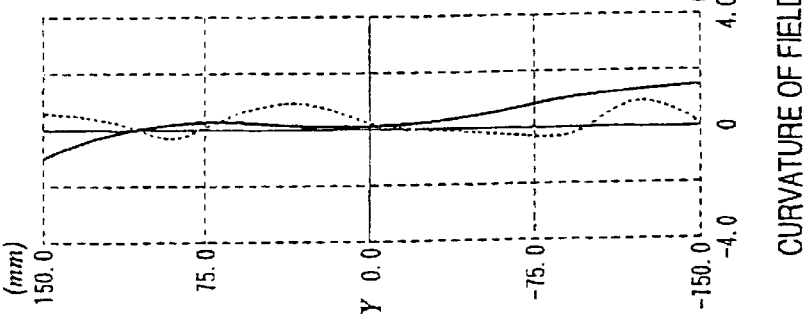
FIG. 5B  CURVATURE OF FIELD
······ MAIN SCANNING DIRECTION
—— AUXILIARY SCANNING DIRECTION
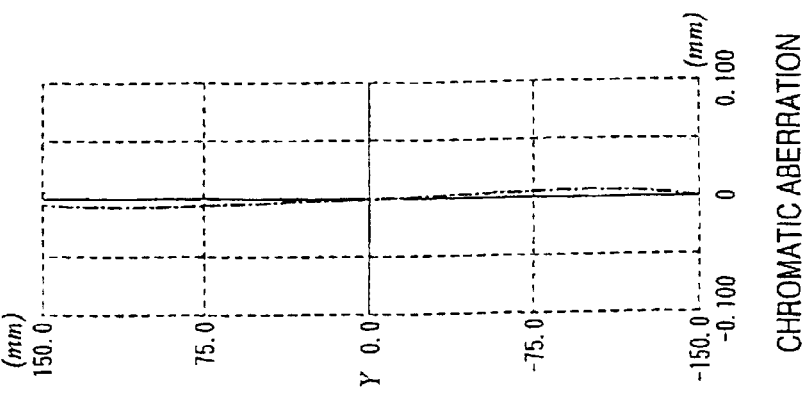
FIG. 5C  CHROMATIC ABERRATION

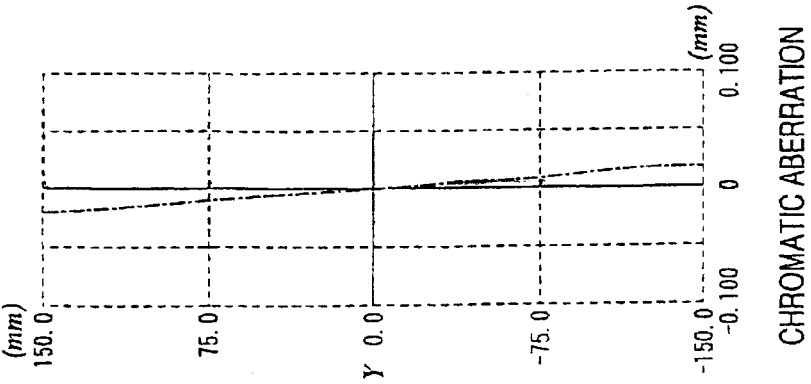
FIG. 6A  LINEARITY
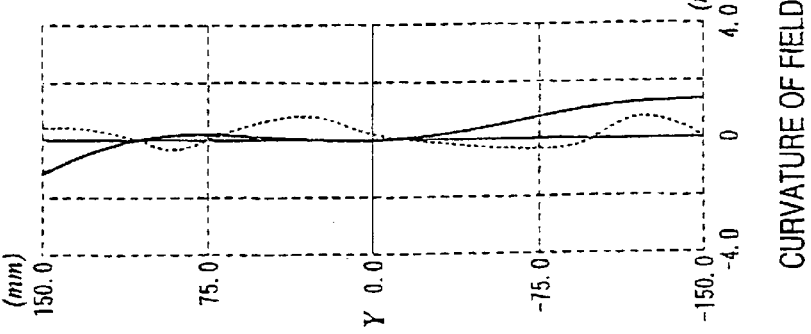
FIG. 6B  CURVATURE OF FIELD
······ MAIN SCANNING DIRECTION
——— AUXILIARY SCANNING DIRECTION
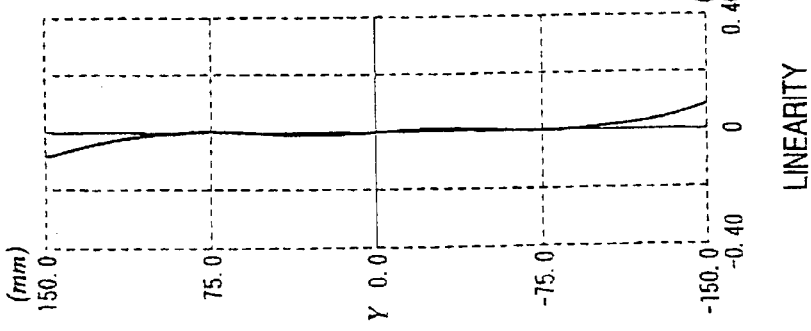
FIG. 6C  CHROMATIC ABERRATION

FIG. 9A  LINEARITY

FIG. 9B  CURVATURE OF FIELD

FIG. 9C  CHROMATIC ABERRATION

······ MAIN SCANNING DIRECTION
——— AUXILIARY SCANNING DIRECTION

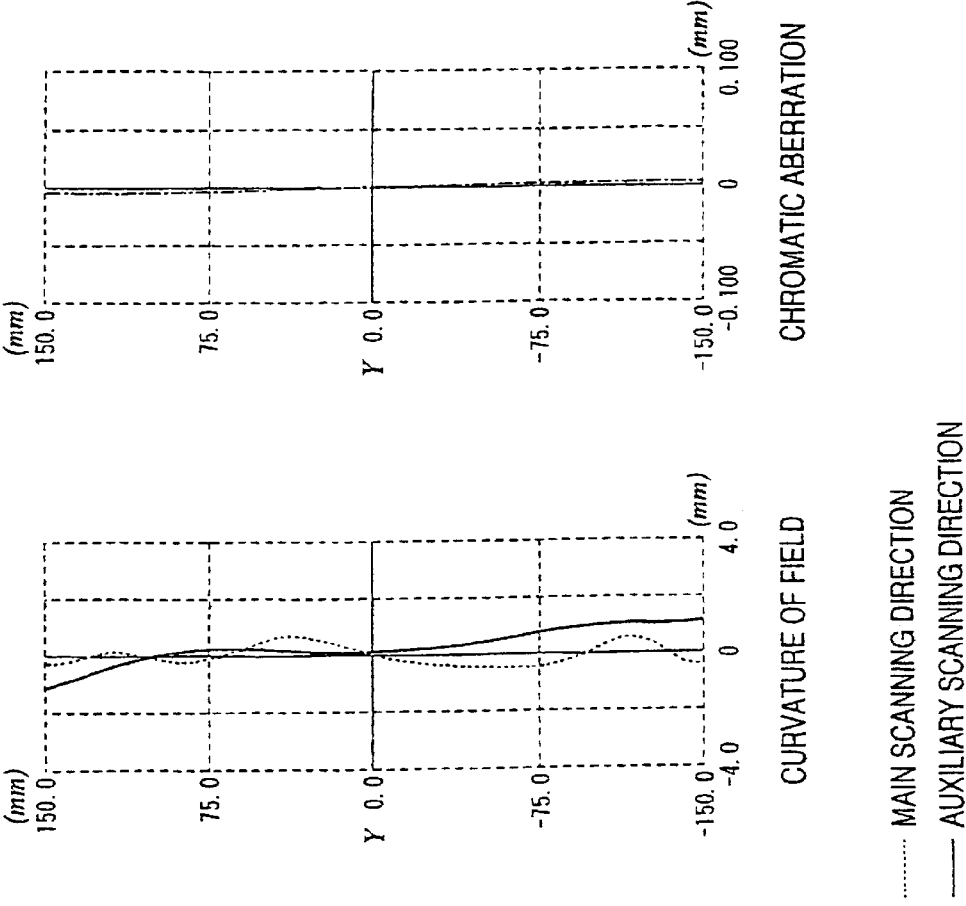
FIG. 12A LINEARITY
FIG. 12B CURVATURE OF FIELD
······ MAIN SCANNING DIRECTION
——— AUXILIARY SCANNING DIRECTION
FIG. 12C CHROMATIC ABERRATION

SCANNING OPTICAL SYSTEM

BACKGROUND OF THE INVENTION

The present invention relates to a scanning optical system which is used as an optical system for a scanning optical device such as a laser beam printer. Particularly, the present invention relates to the achromatic scanning optical system.

The scanning optical device deflects beams emitted from a light source such as a laser diode by means of, for example, a polygonal mirror, and converges the beam to form a spot on a surface to be scanned such as a surface of a photoconductive drum, through an fθ lens (scanning lens). The beam spot formed on the surface to be scanned moves (i.e., scans) on the surface in a predetermined scanning direction as the polygonal mirror rotates. In this specification, the direction in which the beam spot scans is referred to as a main scanning direction. Further, a plane including the scanning beam scanning in the main scanning direction is referred to as a main scanning plane. Furthermore, a direction perpendicular to the main scanning lane is referred to as an auxiliary scanning direction.

The fθ lens is provided with a single lens element or plurality of lens elements, and various types of aberrations are corrected such that the spot on the surface to be scanned scans linearly in the main scanning direction, at a constant speed on the surface to be scanned as the polygon mirror rotates at a constant rotation speed.

Recently, in order to increase an image forming speed, there has been developed a multi-beam scanning device which is provided with a plurality of light sources, such as laser diodes. The plurality of laser diodes emit a plurality of beams to form a plurality of scanning lines simultaneously. In a scanning optical system employed in such a multi-beam scanning device, positional relationship between the scanning lines formed by the plurality of scanning beams should be adjusted accurately such that a plurality of scanning lines are apart from each other by a predetermined distance.

In such a multi-beam scanning device, generally, wavelengths of the beams emitted by the plurality of laser diodes distribute, for example, within a range of a standard designed value ±15 nm. Therefore the wavelengths of two laser diodes forming the adjacent scanning lines may be different by 30 nm at the maximum. It the fθ lens has a lateral chromatic aberration, a writing start position along the main scanning direction, from which the scanning beam spot contributes to image formation, and a writing complete position, which is the end of the image portion on the scanning line, may differ between a plurality of lines, which may exceed an allowable range, and affects the quality of formed image.

Conventionally, the chromatic aberration of the fθ lens is compensated by combining a positive lens and a negative lens having different dispersion. Alternatively, the chromatic aberration due to variation of wavelengths emitted by the respective laser diodes may be reduced by selecting laser diodes which emit laser beams having closer wavelengths, i.e., by selecting laser diodes such that the emission wavelengths thereof distribute within a smaller range.

In order to correct the chromatic aberration of the fθ lens by selecting a lens materials (glass materials) having different dispersion as in the prior art described above, the number of lens elements of the fθ lens increases when compared with a case where the chromatic aberration is not corrected. In addition, in order to compensate for the chromatic aberration, lens materials cannot be selected only by their refractive indexes, and types of available lens materials are limited, thereby degree of freedom in designing the lens is lowered.

On the other hand, the selection of the laser diodes takes much time, and difference in the emission wavelengths due to variation in used periods o0 the light sources cannot be overcome.

SUMMARY OF THE INVENTION

It is therefore an object of the invention to provide an improved scanning optical system whose lateral chromatic aberration is compensated so that deterioration in image forming characteristics due to uneven wavelengths emitted by a plurality of laser diodes is avoidable without increasing the number of lens elements.

For the above object, according to the invention, there is provided an improved scanning optical system, including a light source; a deflector, which deflects a beam emitted from the light source; and a scanning lens having passive refractive power for converging the beam deflected by the deflector onto a surface to be scanned. The scanning lens includes at least one refractive lens element and a diffractive lens structure which is formed on at least one surface of the refractive lens element. The diffractive lens structure compensates a lateral chromatic aberration caused by the refractive power of the scanning lens and satisfies the following condition (1);

$$0.3 \leq m/W \leq 4.0 \tag{1}$$

where m is a number of periodic patterns of the diffractive lens structure covered by the incident light beam having the maximum scan angle W (unit: degrees).

With this construction, the chromatic aberration caused by the refractive lens element can be cancelled without increasing the number of lenses.

In particular case, to minimize the lateral chromatic aberration, the range of the condition (1) may be narrowed as the following condition (2);

$$0.7 \leq m/W \leq 3.0. \tag{2}$$

Optionally, the light source emits a plurality of beams which are to be converged on different positions on the surface to be scanned, and the deflector deflects all of the plurality of beams. When a plurality of laser diodes are used to emit the plurality of beams simultaneously, wavelengths of the beams may be different from each other. Even in such a case, since the chromatic aberration is compensated, the optical system can be used for the above-described multi-beam emitting device, and image forming operation can be performed at high accuracy.

It is preferable that the diffractive lens structure may have rings concentric about an optical axis of the diffractive lens structure.

Preferably, the diffractive lens structure may be formed on a rotationally symmetrical lens surface of the refractive lens element. in view of processing a mold, if the diffractive lens structure is formed on the rotationally symmetrical surface of the refractive lens element, it is relatively easy to process.

It is further preferable that the diffractive lens structure may be formed on a surface, which is closest to the defector, of the plurality of surfaces of the refractive lens elements.

According to another aspect of the invention, the diffractive lens structure is Formed on one surface of the refractive lens element where the width of the incident light beam having the maximum scan angle in a main scanning direction is maximized.

According to still another aspect of the invention, the diffractive lens structure is formed on the surface that is closest to the deflector in the surfaces having positive refractive power or the surface having non-positive power (i.e., no power or negative power) that is closer to the deflector than the closest surface having positive power.

According to yet anther aspect of the invention, the diffractive lens structure is formed on one surface of the refractive lens element where the incident angle of the incident light beam having the maximum scan angle in a main scanning direction is maximized.

BRIEF DESCRIPTION OF THE DRAWINGS

FIGS. 4A, 4B and 4C show aberration characteristics of the optical system of the first embodiment, wherein FIG. 4A shows linearity errors, FIG. 4B shows a curvature of field, and FIG. 4C shows a lateral chromatic aberration;

FIGS. 5A, 5B and 5C show aberration characteristics of the optical system of the second embodiment, wherein FIG. 5A shows linearity errors, FIG. 5B shows a curvature of field, and FIG. 5C shows a lateral chromatic aberration;

FIGS. 6A, 6B and 6C show aberration characteristics of the optical system of the third embodiment, wherein FIG. 6A shows linearity errors, FIG. 6B shows a curvature of field, and FIG. 6C shows a lateral chromatic aberration;

FIGS. 9A, 9B and 9C show aberration characteristics of the optical system of the third embodiment, wherein FIG. 9A shows linearity errors, FIG. 9B shows a curvature of field, and FIG. 9C shows a lateral chromatic aberration;

FIGS. 12A, 12B and 12C show aberration characteristics of the optical system of the third embodiment, wherein FIG. 12A shows linearity errors, FIG. 12B shows a curvature of field, and FIG. 12C shows a lateral chromatic aberration.

DETAILED DESCRIPTION OF THE PREFERRED EMBODIMENTS

An optical scanning system provided with a diffraction lens structure according to embodiments of the invention will be described with reference to the accompanying drawings.

Figure 1:
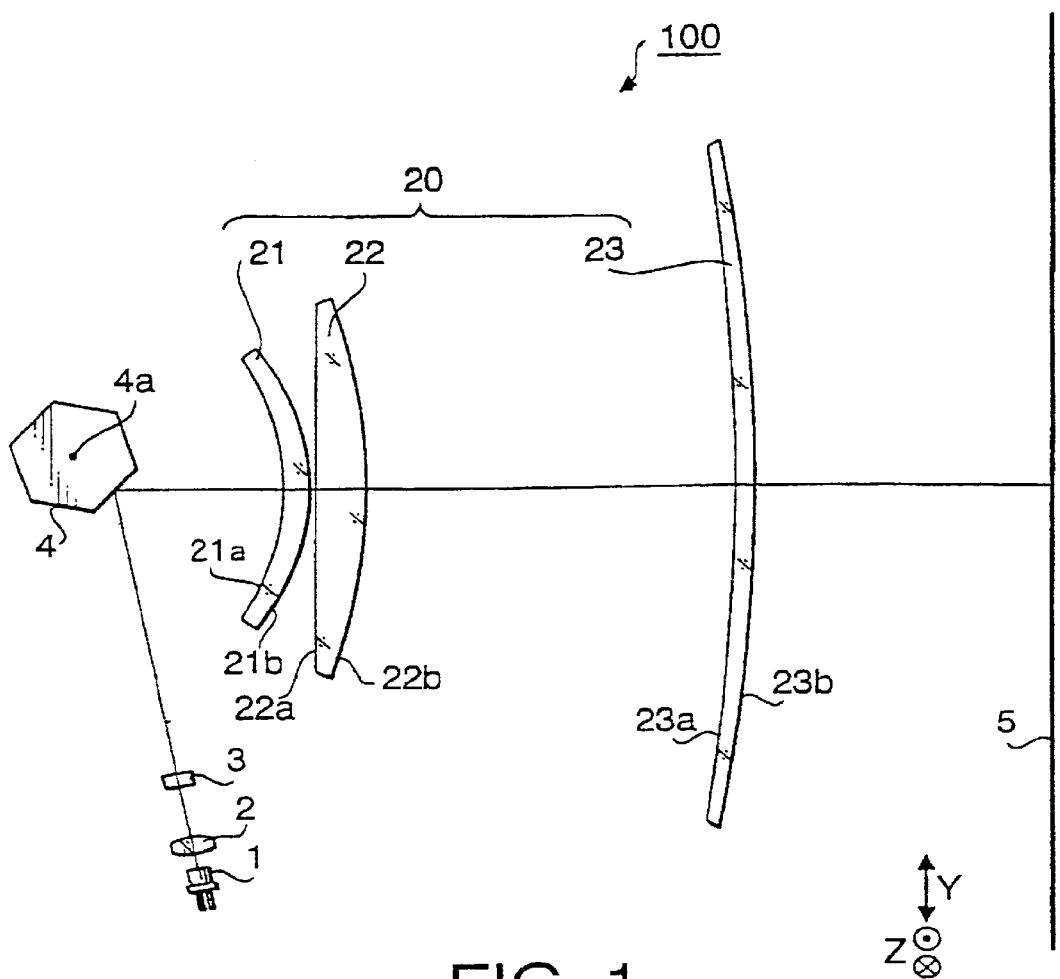
FIG. 1 is a diagram showing an arrangement of optical elements of a scanning optical system, viewed in a main scanning plane, according to first through third embodiments.
Figure 2:
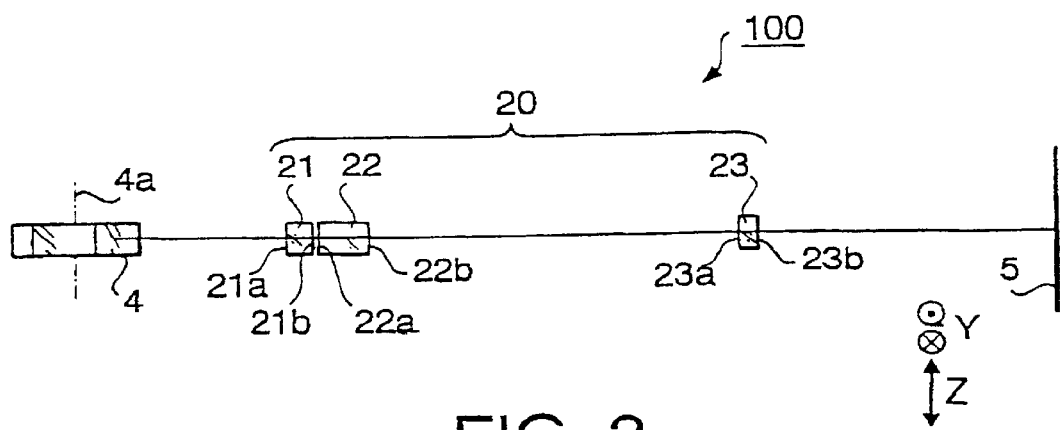
FIG. 2 is a diagram showing the arrangement of the optical elements of FIG. 1 viewed from a direction perpendicular to an auxiliary scanning direction.

FIG. 1 is a diagram illustrating a basic construction or a scanning optical system 100 that is common for first, second and third embodiments, viewed in a direction perpendicular to a main scanning direction (indicated by arrow Y in FIG. 1), and parallel to an auxiliary scanning direction (indicated by arrow Z in FIG. 2). In other words, a surface of FIG. 1 coincides with the main scanning plane. FIG. 2 is a diagram of the scanning optical system shown in FIG. 1, viewed from a direction perpendicular to the auxiliary scanning direction Z, and parallel to the main scanning direction Y.

The scanning optical system 100 has a light source 1. The light source 1 emits a plurality of laser beams, which are parallel to each other, and arranged in the auxiliary scanning direction. Laser beans emitted from the light source 1 are collimated into parallel beams by a collimator lens 2, and projected onto a polygon mirror (deflector) 4 through a cylindrical lens 3 having a positive power only in the auxiliary scanning direction Z. Therefore, the parallel beams are converged in the auxiliary scanning direction to form linearly extending images on a plane closely adjacent to light reflection surfaces of the polygon mirror 4. The polygon mirror 4 is driven to rotate about a rotating axis 4a. The laser begins incident on the polygon mirror 4 are deflected by the reflection surfaces of the polygon mirror 4, and substantially circular beam spots are formed on a surface to be scanned 5 through an fθ lens 20.

It should be noted that, the above-described scanning optical system 100 is a multi-beam scanning optical system, and the light source 1 may be a multi-point emission laser diode. Alternatively, beams from a plurality of different laser diodes are combined with use of a beam composing element such as a beam combiner. In such cases, spots corresponding to the plurality of beams should be arranged on the surface to be scanned 5 such that the spots are spaced apart, in the auxiliary scanning direction, by a predetermined distance. Thus, a plurality of scanning lines are formed at one scanning. Further alternatively, the light source 1 could be a single laser diode emitting a single laser beam.

The fθ lens 20 includes three lens elements, which are:

a first meniscus lens 21 having a positive power in both the main scanning and auxiliary scanning directions;

a second plano-convex lens 22 having a positive power in both the main scanning and auxiliary scanning directions; and a third elongated lens 23 elongated in the main scanning direction, and having a positive power substantially only in the auxiliary scanning direction, in this order along the direction from the polygon mirror 4 to the surface to be scanned 5. The first and second lenses 21 and 22 are located at positions close to the polygon mirror 4, and the third lens 23 is positioned close to the surface to be scanned 5.

The polygon mirror side surface 21a of the first lens 21 is formed with a diffractive lens structure. The diffractive lens structure compensates a lateral chromatic aberration caused by the refractive lens elements. The diffractive lens structure is formed, similar to a Fresnel lens, as a large number of periodic patterns such as concentric rings each of which has a wedge sectional shape. Each of the boundaries between the adjacent rings is formed as a step giving a predetermined optical path difference. The base curve of the surface 21a is a rotationally symmetrical aspherical surface. The base curve is defined as a shape of the refractive lens element that does not include the diffractive lens structure. In view of facility in processing a mold, it is advantageous to form the diffractive lens structure on the rotationally symmetrical base curve. The other lens surface 21b of the first lens 21 is a rotationally symmetrical aspherical surface.

The second lens 22 has a lens surface 22a which is a flat surface, on the polygon mirror side, and a lens surface 22b, which is a convex spherical surface, on the scanned surface side.

The third lens 23 has a polygon mirror side surface 23a that has a modified toric surface defined as a non-circular arc curve on the main scanning plane being rotated about an axis that is perpendicular to the optical axis and included in the main scanning plane. The third lens 23 has a convex spherical surface 23b on the scanned surface side.

Figure 3:
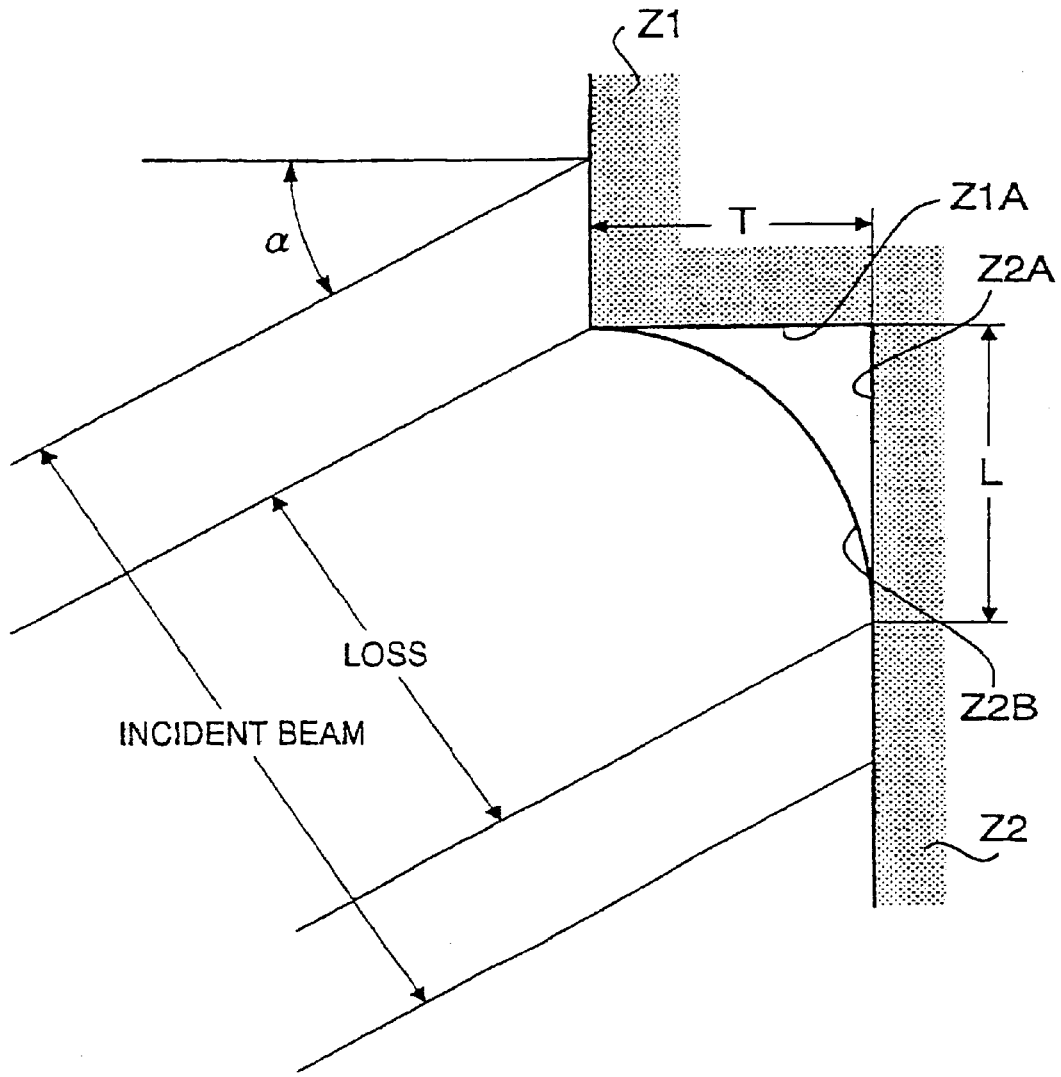
FIG. 3 is a diagram showing loss of light quantity at a boundary between adjacent rings of a diffraction lens structure.

FIG. 3 is an enlarged view of a boundary between adjacent rings of a diffractive lens structure. If the diffractive lens structure is completely formed, the step between the adjacent ring surfaces Z1 and Z2 rises straight up as shown by surfaces Z1A and Z2A. In such a case, when the light beam is incident on the diffractive lens structure at the incident angle of $\alpha$, the light beam being incident on the ring surfaces Z1 and Z2 is diffracted as a effective light beam, while the step surface Z1A loses the light beam which is incident thereon. It should be noted thaw the incident angle $\alpha$ is the angle in the main scanning plane formed between the normal of the base curve at a point on which the light beam is incident and the center axis of the incident light beam.

Practically, the step is formed as a curved surface Z2B due to processing limit of metal molds, The ring surface Z1 smoothly continues on the ring surface Z2 through the curved surface Z2B. The curved surface Z2B covers an edge portion Z2A of the ring surface Z2 whose length is L from the boundary between the ring surfaces Z1 and Z2. The curved surface Z2B loses the light beam which is incident thereon as shown in FIG. 3.

The loss of the light beam increases as the incident angle a increases. Further, the greater the number of the rings struck by the incident light beam is, the grater the correction amount of the chromatic aberration is, while which increases the loss of light quantity.

If the f$\theta$ lens 20 is not corrected in chromatic aberration, the lateral chromatic aberration increases with increasing a scan angle. The scan angle is an angle in the main scanning plane formed between the optical axis of the f lens 20 and the center axis of the light deflected by the polygon mirror 4. Thus, since the peripheral portion having large scan angle requires larger number of rings rather than the center portion, the loss of light quantity increases as the scan angle increases.

The correction amount of the chromatic aberration determines the number of the rings covered by a light beam of a predetermined scan angle regardless of the position of the diffractive lens structure in the f$\theta$ lens. When the surface on which the diffractive lens structure is formed and the scan angle are determined, the incident angle onto the diffractive lens structure is determined. And thus, the number of rings and the incident angle determines the total area that loses the light quantity. The loss of light quantity LOSS is found by the following equation (A);

$$LOSS = Ks \cdot \frac{SA}{sf} \quad (A)$$

where Ks is a constant, SA is the total area that loses the light quantity, and sf is an area on which the light beam is incident.

The diffractive lens structure should be formed on the lens surface where becomes minimum in order to minimize the loss of light quantity.

A first method to minimize the value of SA/sf is to decrease SA.

The number of the rings (the number of periodic patterns) increases as the correction amount of the chromatic aberration increases. Therefore, if the tolerance of remaining chromatic aberration is relatively large, the number of rings can be reduced with reduction of the loss of light quantity. The f$\theta$ lens 20 of the embodiments satisfies the following condition (1);

$$0.3 \leq m/W \leq 4.0 \quad (1)$$

where m is a number of periodic patterns of the diffractive lens structure covered by the incident light beam having the maximum scan angle W (unit: degrees). The light beam having the maximum scan angle W converges onto the scanned surface 5 at the edge of the effective scanning range. A strict definition of the number m will be described bellow.

When the condition (1) is satisfied, the loss of light quantity decreases with keeping the sufficient correction amount of the chromatic aberration. If m/W is lower than 0.3, the correction amount of the chromatic aberration becomes short. If m/W is higher than 4.0, the loss of light quantity becomes too large, decreasing the diffraction efficiency.

In particular case, to minimize the lateral chromatic aberration, the range of the condition (1) may be narrowed as the following condition (2);

$$0.7 \leq m/W \leq 3.0. \quad (2)$$

A second method to minimize the value of SA/sf is to increase sf.

Namely, if the diffractive lens structure is formed on the surface having large value of sf, the Ross of light quantity can be reduced with constant SA. In the other words, when the diffractive lens structure is formed on the lens surface where the width of the incident light beam having the maximum scan angle in a main scanning direction is maximized, the loss of light quantity can be reduced.

From an another view point, the diffractive lens structure may be formed on the surface that is closest to the polygon mirror 4 in the surfaces having positive refractive power or the surface having no power or negative power that is closer to the polygon mirror 4 than the closest surface having positive power. Since the deflected light beam is converged onto the scanned surface 5 through the f$\theta$ lens 20, the closer the distance from the polygon mirror 4 is, the larger the width of the light beam is. Therefore, forming the diffractive lens structure on the lens surface close to the polygon mirror 4 reduces the width of the light beam, increasing the value of sf, which decreases the loss of light quantity.

From still another view point, the diffractive lens structure may be formed on one surface of the refraction lens element where the incident angle $\alpha$ of the incident light beam having the maximum scan angle in a main scanning direction is maximized. The larger the incident angle $\alpha$ is, the larger the width of the incident light beam is. And therefore, when the diffractive lens structure is formed on the lens surface where the incident angle of the incident light beam having the maximum scan angle becomes maximum, the value of sf increases, which decreases the loss of light quantity.

Numerical constructions of the embodiments will be described hereinafter. Rules for expressing the rotationally symmetrical aspherical surface, the diffractive lens structure and the modified toric surface included in the f$\theta$ lens 20 are described first.

The rotationally symmetrical aspherical surface is expressed by the following equation (B).

$$X(h) = \frac{h^2}{r\left\{1 + \sqrt{1 - \frac{(K+1)^2 h^2}{r^2}}\right\}} + A4h^2 + A6h^6 + A8h^8 + \ldots \quad (B)$$

X(h) is a SAG, that is, a distance of a curve from a tangential plane at a point on the surface where the height from the optical axis is h. Symbol K is a conic constant, r is a radius of curvature on the optical axis, A4, A6 and A8 are aspherical surface coefficients of fourth, sixth and eighth orders.

The diffractive lens structure is expressed by the optical path differential function $\Delta\phi(h)$ that is defined by the following equation (C).

$$\Delta\phi(h) = P2h^2 + P4h^4 + P6h^6 + P8h^8 + P10h^{10} \quad (C)$$

P2, P4, P6, P8 and P10 are coefficients of second, fourth, sixth, eighth and tenth orders, h is a height from the optical axis.

The practical shape of the diffractive lens structure is expressed by the following equation (D)

$$S(h) = \frac{\{MOD(\Delta\phi(h) + C, -1) | -C\}\lambda}{n - 1 + Eh^2} \quad (D)$$

Symbol C is a constant defining a phase at a boundary between adjacent rings ($0 \leq C < 1$), $\lambda$ is a design wavelength of the light beam, E is a coefficient for correcting the change of the optical path differential function due to the diagonal incidence of the light beam on the diffractive lens structure, and n is a refractive index of the diffractive lens structure. The function MOD(x, y) represents the remainder when x is divided by y. MOD($\Delta\phi(h)+C$, −1) is equal to zero at the boundary. In the embodiments, the constant C is equal to 0.5.

When the diffractive lens structure is formed on the rotationally-symmetrical aspherical surface, the total shape TS(h) of the lens surface or. which the diffractive lens structure is formed is expressed by the equation (E).

$$TS(h) = X(h) + S(h) \quad (E)$$

When the diffractive lens structure is formed on the flat surface, the total shape TS(h) is equal to S(h) described in the equation (D).

The strict definition of the number m is expressed by the following equation (F).

$$m = INT(|\Delta\phi(hmax) + C|) - INT(|\Delta\phi(hmin) + C|) \quad (F)$$

Symbols hmax and hmin are heights of the incident points of light rays from the optical axis, hmax is the maximum value in the light beam and hmin is the minimum value in the light beam. Namely, the most outside ray in the light beam having the maximum scan angle intersects the diffraction lens structure at the point of hmax in height, the most inside ray in the light beam having the maximum scan angle intersects the structure at the point of hmin in height. The modified toric surface is defined as a locus when the non-circular arc curve is rotated about an axis that is perpendicular to the optical axis and is located on the rain scanning plane. The non-circular arc curve is defined as the following equation (G).

$$X(Y) = \frac{Y^2}{r\left\{1 + \sqrt{1 - \frac{(K+1)^2 Y^2}{r^2}}\right\}} + A4Y^2 + A6Y^6 + A8Y^8 + \ldots \quad (G)$$

X(Y) is a SAG, i.e., a distance corresponding to a point on the non-circular arc curve with respect to a tangential line at a point where the optical axis intersects the non-circular arc curve, Y is a distance, in the main scanning direction, of the point from the optical axis. The other symbols are identical to in the equation (B).

First Embodiment

The following Table 1 shows the lens arrangement of the scanning optical system 100 according to the first embodiment on the scanned surface side with respect to the cylindrical lens 3.

Symbol f in the table represents a focal length of the fθ lens 20 in the main scanning direction, SW is a scan width on the scanned surface 5, W is the maximum scan angle, $\lambda$ is the design wavelength, ry is a radius of curvature in the main scanning direction, rz is a radius of curvature in the auxiliary scanning direction (which will be omitted if a surface is a rotationally symmetric surface), d is a distance between surfaces along the optical axis, n is a refractive index at the design wavelength, i.e., 780 nm.

In Table 1, surface numbers #1 and #2 define the cylindrical lens 3, surface numbers #3 represents the light reflection surface of the polygon mirror 4, surface numbers #4 and #5 define the first lens 21, surface numbers #6 and #7 define the second lens 22, and surface numbers #8 and #9 represent the third lens 23.

The diffractive lens structure is formed on the polygon mirror side surface 21a (#4) of the first lens 21. The surface 21a has non-positive power (i.e., negative power) that is closer to the polygon mirror than the closest surface 21b in the surfaces having positive power.

TABLE 1

| f = 200.0 mm | SW = 300 mm | W = 43.0° | λ = 780 nm | |
|---|---|---|---|---|
| Surface Number | ry | rz | d | N |
| #1 | ∞ | 50.000 | 4.000 | 1.51072 |
| #2 | ∞ | | 94.500 | |
| #3 | ∞ | | 50.000 | |
| #4 | −111.618 | | 7.000 | 1.48617 |
| #5 | −97.061 | | 2.000 | |
| #6 | ∞ | | 15.000 | 1.76591 |
| #7 | −193.160 | | 110.000 | |
| #8 | −663.528 | 32.298 | 5.000 | 1.48617 |
| #9 | −672.444 | | 88.120 | |

It should be noted that the radius of curvature of each of the aspherical surfaces and the modified toric surface indicated in Table 1 is a radius of each of optical elements on the optical axis, and the conical coefficients, aspherical surface coefficients, and non-circular arc curve coefficients for respective surfaces are indicated in Table 2.

TABLE 2

| Surface Number | K | A4 | A6 | A8 |
|---|---|---|---|---|
| #4 | 2.80 | $-1.304 \times 10^{-6}$ | $3.390 \times 10^{-10}$ | $1.732 \times 10^{-14}$ |
| #5 | 0.80 | $-9.924 \times 10^{-7}$ | $1.078 \times 10^{-10}$ | $3.297 \times 10^{-14}$ |
| #8 | 0.00 | $8.526 \times 10^{-9}$ | $3.920 \times 10^{-13}$ | $-2.517 \times 10^{-17}$ |

Further, the coefficients P2, P4, P6, P8, P10 and E for defining the diffractive lens structure in the equations (C) and (D) are shown in Table 3.

TABLE 3

| P2 | $-1.712 \times 10^{-1}$ |
|---|---|
| P4 | $-4.661 \times 10^{-5}$ |
| P6 | $1.542 \times 10^{-8}$ |
| P8 | $-1.239 \times 10^{-11}$ |
| P10 | 0 |
| E | 0 |

The focal length of the diffractive lens structure itself is 2662.2 mm at wavelength of 780 m. The value of m/W is 2.7, which satisfies the condition (1) and the loss of light quantity at the maximum scan angle is 3.6%.

FIGS. 4A, 4B and 4C show aberration characteristics of the optical system of the first embodiment, wherein FIG. 4A shows linearity errors, FIG. 4B shows a curvature of field (dotted line: in the main scanning direction; and solid line: in the auxiliary direction), and FIG. 4C shows a lateral chromatic aberration. The axis of ordinate of each graph represents an image height (height of scanning spot on the surface to be scanned 5 from a point where the optical axis intersects the surface to be scanned 5), the axis of abscissa represents amount of each aberration, and the unit is millimeter for both axes.

Second Embodiment

The following Table 4 shows the lens arrangement of the scanning optical system 100 according to the second embodiment. The surface numbers represent each of optical elements as well as in the first embodiment. The conical coefficients, aspherical surface coefficients, and non-circular arc curve coefficients for respective surfaces are indicated in Table 5. The diffractive lens structure is formed on the polygon mirror side surface 21*a* (#4) of the first lens 21.

TABLE 4 f = 200.0 mm  SW = 300 mm  W = 43.0°  λ = 780 nm

| Surface Number | ry | rz | d | n |
|---|---|---|---|---|
| #1 | ∞ | 50.000 | 4.000 | 1.51072 |
| #2 | ∞ | | 94.500 | |
| #3 | ∞ | | 50.000 | |
| #4 | −111.618 | | 7.000 | 1.48617 |
| #5 | −97.974 | | 2.000 | |
| #6 | ∞ | | 15.000 | 1.76591 |
| #7 | −191.651 | | 110.000 | |
| #8 | −668.742 | 32.340 | 5.000 | 1.48617 |
| #9 | −672.495 | | 88.120 | |

TABLE 5

| Surface Number | K | A4 | A6 | A8 |
|---|---|---|---|---|
| #4 | 2.80 | $-1.304 \times 10^{-6}$ | $3.390 \times 10^{-10}$ | $1.732 \times 10^{-14}$ |
| #5 | 0.80 | $-9.940 \times 10^{-7}$ | $1.126 \times 10^{-10}$ | $3.208 \times 10^{-14}$ |
| #6 | 0.00 | $7.934 \times 10^{-9}$ | $4.050 \times 10^{-13}$ | $-2.534 \times 10^{-17}$ |

Further, the coefficients P2, P4, P6, P8, P10 and E for defining the diffraction lens structure in the equations (C) and (D) are shown in Table 6.

TABLE 6

| P2 | $-1.712 \times 10^{-1}$ |
|---|---|
| P4 | $-4.894 \times 10^{-5}$ |
| P6 | $1.581 \times 10^{-8}$ |
| P8 | $-1.294 \times 10^{-11}$ |
| P10 | 0 |
| E | 0 |

The focal length of the diffraction lens structure itself is 3576.9 mm at wavelength of 780 nm. The value of m/W is 2.9, which satisfies the condition (1) and the loss of light quantity at the maximum scan angle is 3.8%.

FIGS. 5A, 5B and 5C show aberration characteristics of the optical system of the second embodiment, wherein FIG. 5A snows linearity errors, FIG. 5B shows a curvature of field, and FIG. 5C shows a lateral chromatic aberration.

Third embodiment

The following Table 7 shows the lens arrangement of the scanning optical system 100 according to the third embodiment. The surface numbers represent each of optical elements as well as in the first embodiment. The conical coefficients, aspherical surface coefficients, and non-circular arc curve coefficients for respective surfaces are indicated in Table 8. The diffractive lens structure is formed on the polygon mirror side surface 21*a* (#4) of the first lens 21.

TABLE 7 f = 200.0 mm  SW = 300 mm  W = 43.0°  λ = 780 nm

| Surface Number | ry | rz | d | n |
|---|---|---|---|---|
| #1 | ∞ | 50.000 | 4.000 | 1.51072 |
| #2 | ∞ | | 94.500 | |
| #3 | ∞ | | 50.000 | |
| #4 | −111.618 | | 7.000 | 1.48617 |
| #5 | −97.755 | | 2.000 | |
| #6 | ∞ | | 15.000 | 1.76591 |
| #7 | −193.688 | | 110.000 | |
| #8 | −663.583 | 32.310 | 5.000 | 1.48617 |
| #9 | −672.101 | | 88.120 | |

TABLE 8

| Surface Number | K | A4 | A6 | A8 |
|---|---|---|---|---|
| #4 | 2.80 | $-1.304 \times 10^{-6}$ | $3.390 \times 10^{-10}$ | $1.732 \times 10^{-14}$ |
| #5 | 0.80 | $-1.007 \times 10^{-6}$ | $1.070 \times 10^{-10}$ | $2.938 \times 10^{-14}$ |
| #8 | 0.00 | $8.369 \times 10^{-9}$ | $4.089 \times 10^{-13}$ | $-2.560 \times 10^{-17}$ |

Further, the coefficients P2, P4, P6, P8, P10 and E for defining the diffraction lens structure in the equations (C) and (D) are shown in Table 6.

TABLE 9

| | |
|---|---|
| P2 | $-1.320 \times 10^{-1}$ |
| P4 | $-3.186 \times 10^{-5}$ |
| P6 | $1.340 \times 10^{-8}$ |
| P8 | $-9.169 \times 10^{-12}$ |
| P10 | 0 |
| E | 0 |

The focal length of the diffraction lens structure itself is 4854.8 mm at wavelength of 780 nm. The value of m/W is 1.9, which satisfies the condition (1) and the loss of light quantity at the maximum scan angle is 2.5%.

FIGS. 6A, 6B and 6C show aberration characteristics of the optical system of the third embodiment, wherein FIG. 6A shows linearity errors, FIG. 6E shows a curvature of field, and FIG. 6C shows a lateral chromatic aberration.

Fourth Embodiment

Figure 7:
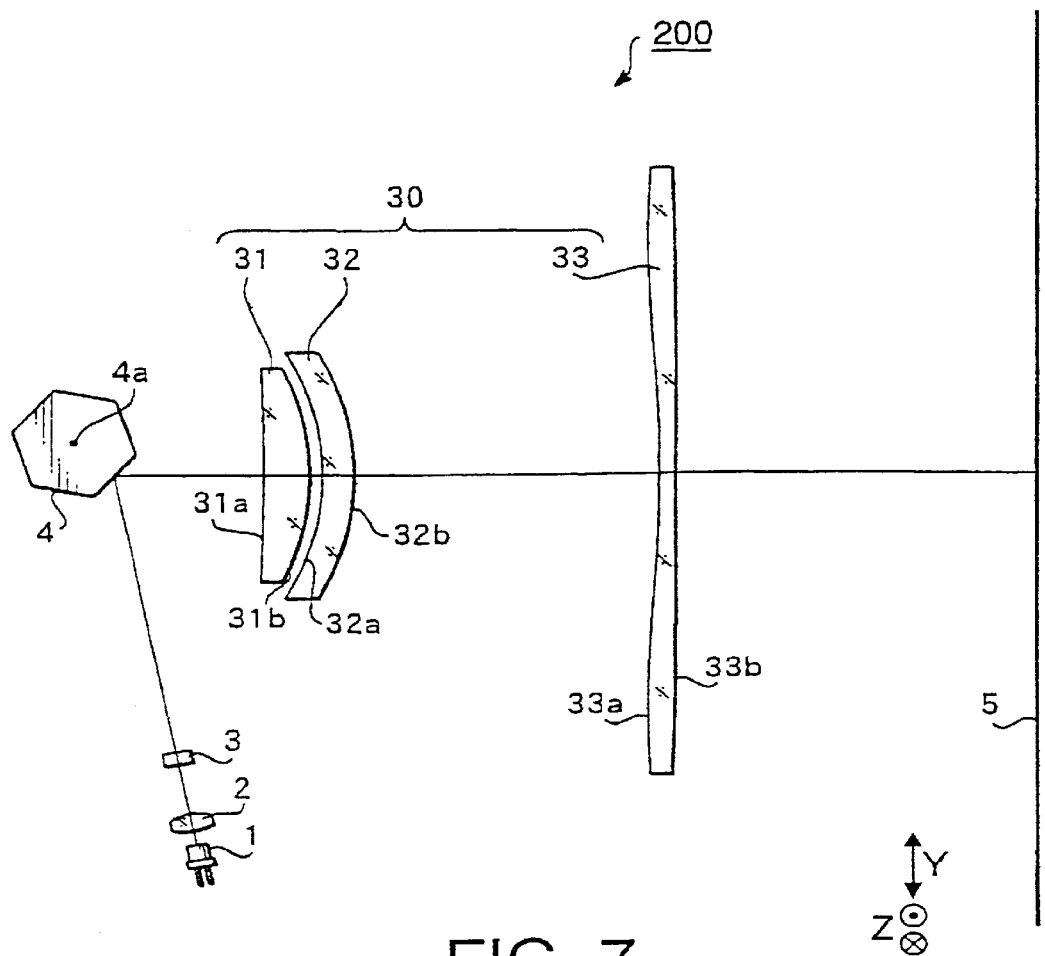
FIG. 7 is a diagram showing an arrangement of optical elements of a scanning optical system, viewed in the main scanning plane, according to a fourth embodiment.
Figure 8:
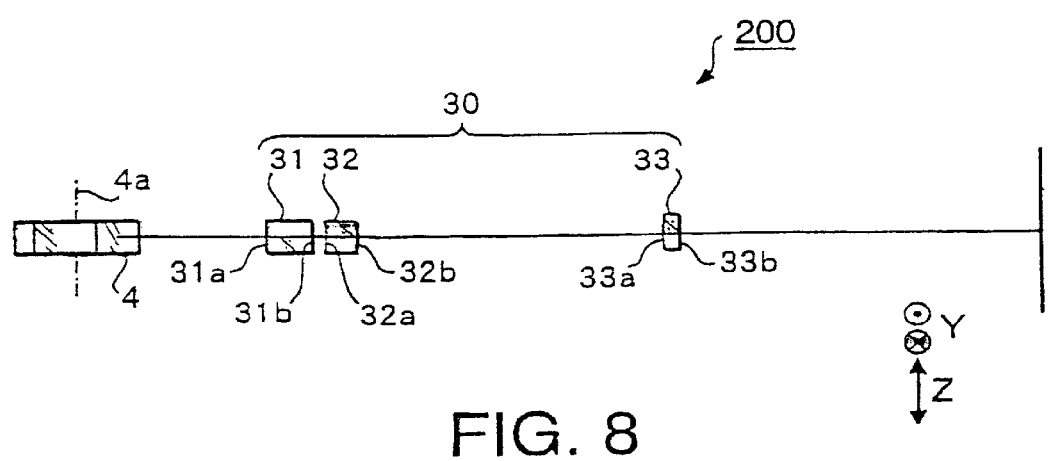
FIG. 8 is a diagram showing the arrangement of the optical elements of FIG. 7 viewed from a direction perpendicular to an auxiliary scanning direction.

FIG. 7 is a diagram illustrating a construction of a scanning optical system 200 according to the fourth embodiment, viewed in a direction perpendicular to a main scanning direction, and parallel to an auxiliary scanning direction. FIG. 8 is a diagram of the scanning optical system shown in FIG. 7, viewed from a direction perpendicular to the auxiliary scanning direction, and parallel to the main scanning direction.

In the fourth embodiment, the fθ lens 20 in the first embodiment is replaced with a fθ lens 30. The other optical elements are identical to those of the first embodiment.

The fθ lens 30 consists of three lens elements, which are:

a first meniscus lens 31 having a positive power in both the main scanning and auxiliary scanning directions;

a second meniscus lens 32 having a positive power in both the main scanning and auxiliary scanning directions; and a third elongated lens 33 elongated in the main scanning direction, and having a positive power substantially only in the auxiliary scanning direction, in this order along the direction from the polygon mirror 4 to the surface to be scanned 5.

The surfaces 31a, 31b, 32a and 32b are rotationally symmetrical aspherical surfaces. The polygon mirror side surface 33a of the third lens 33 is a curved surface of which a center of curvature in the auxiliary scanning direction varies along the direction of the optical axis in accordance with the position along the main scanning direction. The shape of the surface 33a in the main scanning plane is expressed by the non-circular arc curve expressed by the equation (G). The radius of curvature rz(Y) of the surface 33a in the auxiliary scanning direction is expressed by the following equation (H).

$$\frac{1}{rz(Y)} = \frac{1}{rz0} + B1Y + B2Y^2 + B3Y^3 + B4Y^4 + B5Y^5 + B6Y^6 + B7Y^7 + B8Y^8 \quad (H)$$

The values B1 through B8 are coefficients that define the radius of curvature rz(Y) at the point where the distance from the optical axis is Y in she main scanning direction, rz0 is a radius of curvature in the auxiliary scanning direction on the optical axis.

The third lens 33 has a convex spherical surface 33b on the scanned surface side.

The following Table 10 shows the lens arrangement of the scanning optical system 200 according to the fourth embodiment. The surface numbers represent each of optical elements as well as in the first embodiment. The conical coefficients, aspherical surface coefficients, and non-circular arc curve coefficients for the surfaces #4, #5, #6 and #7 are indicated in Table 5. The diffraction lens structure is formed on the scanned surface side surface 31b (#5) of the first lens 31. The surface 31b is the surface that is closest to the polygon mirror in the surfaces having positive power.

TABLE 10 f = 200.0 mm   SW = 300 mm   W = 43.0°   λ = 780 nm

| Surface Number | ry | rz | d | n |
|---|---|---|---|---|
| #1 | ∞ | | 50.000 | 4.000 | 1.51072 |
| #2 | ∞ | | | 94.500 | |
| #3 | ∞ | | | 50.000 | |
| #4 | -515.300 | | | 15.000 | 1.48617 |
| #5 | -102.500 | | | 4.000 | |
| #6 | -111.700 | | | 10.000 | 1.48617 |
| #7 | -82.650 | | | 97.000 | |
| #8 | -375.420 | | 29.286 | 5.000 | 1.48617 |
| #9 | -3546.000 | | | 88.470 | |

TABLE 11

| Surface Number | K | A4 | A6 | A8 |
|---|---|---|---|---|
| #4 | 0.00 | $3.000 \times 10^{-7}$ | 0.000 | 0.000 |
| #5 | 0.00 | $-6.500 \times 10^{-7}$ | $-5.640 \times 10^{-11}$ | 0.000 |
| #6 | 0.00 | $-7.540 \times 10^{-7}$ | $5.420 \times 10^{-11}$ | 0.000 |
| #7 | 0.00 | $2.120 \times 10^{-7}$ | $1.380 \times 10^{-10}$ | 0.000 |

The conical coefficients and non-circular arc curve coefficients to define the shape of the polygon mirror surface 33a of the third lens in the main scanning direction are shown in Table 12. The radius of curvature rz0 and the coefficients B1 through B8 to define the shape of the surface 33a in the auxiliary scanning direction are expressed in Table 13.

TABLE 12

| | |
|---|---|
| K | 0.000 |
| A4 | $1.42 \times 10^{-7}$ |
| A6 | $-5.95 \times 10^{-12}$ |
| A8 | $1.19 \times 10^{-16}$ |
| A10 | 0 |

TABLE 13

| | |
|---|---|
| rz0 | 29.29 |
| B1 | $-3.03 \times 10^{-6}$ |
| B2 | $-9.26 \times 10^{-7}$ |
| B3 | 0.0 |
| B4 | $1.35 \times 10^{-11}$ |
| B5 | 0.0 |
| B6 | $3.35 \times 10^{-16}$ |
| B7 | 0.0 |
| B8 | 0.0 |

Further, the coefficients P2, P4, P6, P8, P10 and E for defining the diffractive lens structure in the equations (C) and (D) are shown in Table 14.

TABLE 14

| | |
|---|---|
| P2 | $-9.910 \times 10^{-2}$ |
| P4 | $-4.468 \times 10^{-7}$ |
| P6 | $-1.345 \times 10^{-8}$ |
| P8 | $2.144 \times 10^{-12}$ |
| P10 | 0 |
| E | 0 |

The focal length of the diffraction lens structure itself is 6468.7 mm at wavelength of 780 nm. The value of m/W is 1.0, which satisfies the condition (1) and the loss of light quantity at the maximum scan angle is 1.6%.

Figure 9:
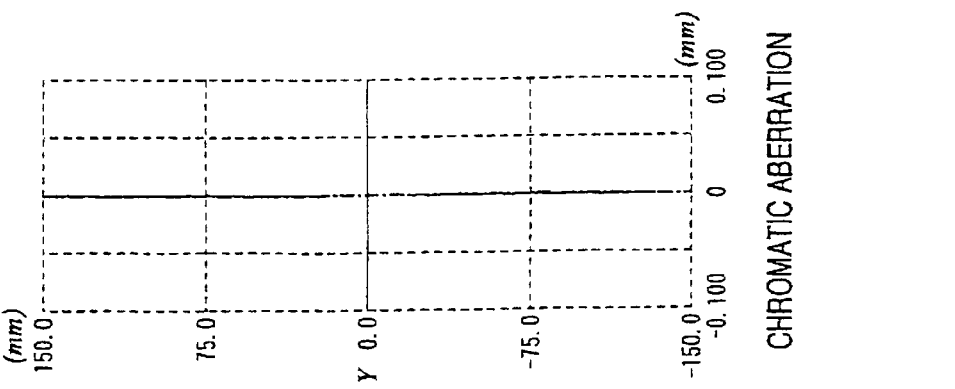

FIGS. 9A, 9B and 9C show aberration characteristics of the optical system of the second embodiment, wherein FIG. 9A shows linearity errors, FIG. 9B shows a curvature of field, and FIG. 9C shows a lateral chromatic aberration.

Fifth Embodiment

Figure 10:
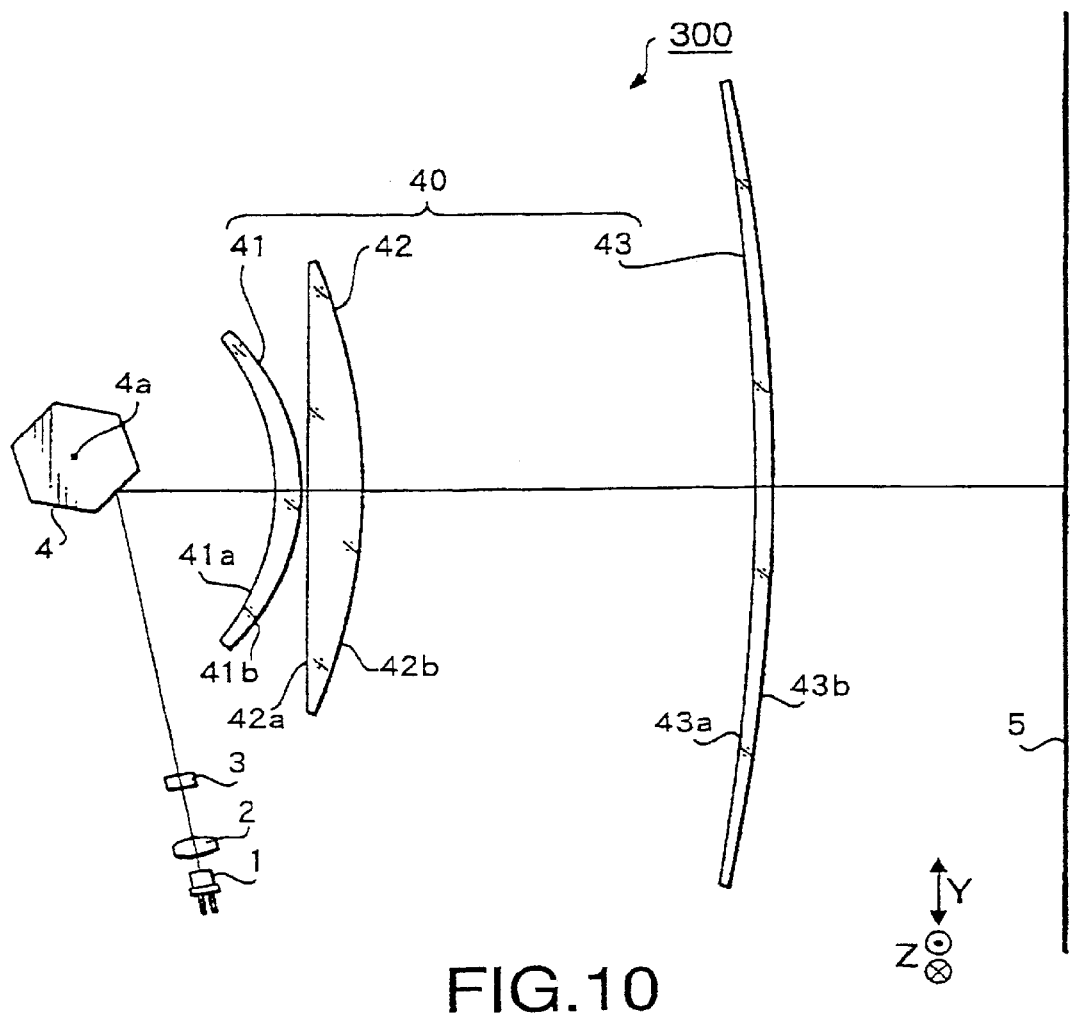
FIG. 10 is a diagram showing an arrangement of optical elements of a scanning optical system, viewed in the main scanning plane, according to a fifth embodiment.
Figure 11:
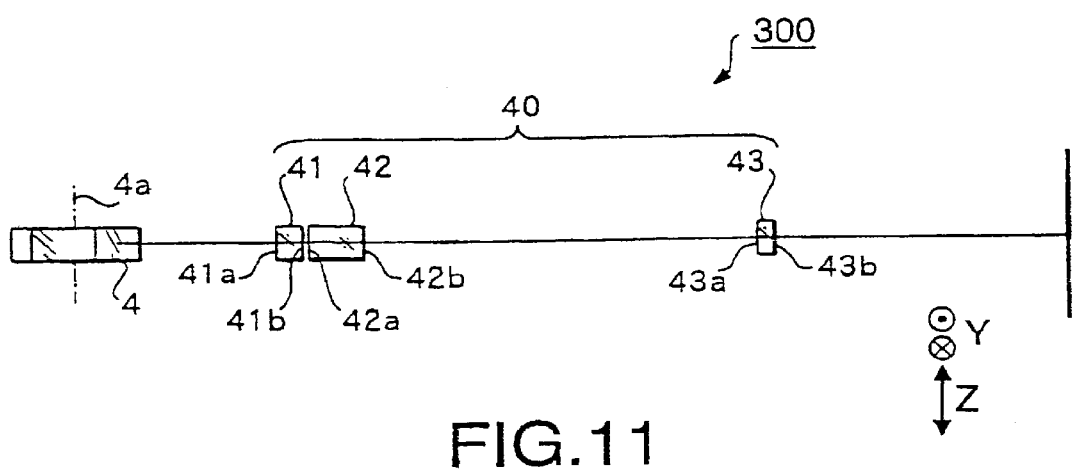
FIG. 11 is a diagram showing the arrangement of the optical elements of FIG. 10 viewed from a direction perpendicular to an auxiliary scanning direction.

FIG. 10 is a diagram illustrating a construction of a scanning optical system 300 according to the fifth embodiment, viewed in a direction perpendicular to a main scanning direction, and parallel to an auxiliary scanning direction. FIG. 11 is a diagram of the scanning optical system shown in FIG. 10, viewed from a direction perpendicular to the auxiliary scanning direction, and parallel to the main scanning direction.

In the fifth embodiment, the fθ lens 20 of the first embodiment is replaced with a fθ lens 40. The other optical elements are identical to those of the first embodiment.

The fθ lens 40 consists of three lens elements, which are:

a first meniscus lens 41 having a positive power in both the main scanning and auxiliary scanning directions;

a second plano-convex lens 42 having a positive power in both the main scanning and auxiliary scanning directions; and a third elongated lens 43 elongated in the main scanning direction, and having a positive power substantially only in the auxiliary scanning direction, in this order along the direction from the polygon mirror 4 to the surface to be scanned 5.

The surfaces 41a and 41b are rotationally symmetrical aspherical surfaces. The second lens 42 has a lens surface 42a which is a flat surface on the polygon mirror side, and a lens surface 42b, which is a convex spherical surface, on the scanned surface side.

The third lens 43 has a polygon mirror side surface 43a that is a modified toric surface and a convex spherical surface 43b on the scanned surface side.

The following Table 15 shows the lens arrangement of the scanning optical system 300 according to the fifth embodiment. The surface numbers represent each of optical elements as well as in the first embodiment. The conical coefficients, aspherical surface coefficients, and non-circular arc curve coefficients for respective surfaces are indicated in Table 16. The diffractive lens structure is formed on the polygon mirror side surface 42a (#6) of the second lens 42.

TABLE 15 f = 200.0 mm    SW = 300 mm    W = 43.0°    λ = 780 nm

| Surface Number | ry | rz | d | n |
|---|---|---|---|---|
| #1 | ∞ | | 50.000 | 4.000 | 1.51072 |
| #2 | ∞ | | 94.500 | |
| #3 | ∞ | | 50.000 | |
| #4 | −114.500 | | 7.000 | 1.48617 |
| #5 | −93.500 | | 2.000 | |
| #6 | ∞ | | 15.000 | 1.76591 |
| #7 | −208.740 | | 110.000 | |
| #8 | −670.000 | 32.330 | 5.000 | 1.48617 |
| #9 | −662.000 | | 88.060 | |

TABLE 16

| Surface Number | K | A4 | A6 | A8 |
|---|---|---|---|---|
| #4 | 2.80 | $-1.300 \times 10^{-6}$ | $3.330 \times 10^{-10}$ | $2.080 \times 10^{-14}$ |
| #5 | 0.80 | $-1.010 \times 10^{-6}$ | $1.030 \times 10^{-10}$ | $2.960 \times 10^{-14}$ |
| #6 | 0.00 | $8.320 \times 10^{-9}$ | $4.340 \times 10^{-13}$ | $-2.950 \times 10^{-17}$ |

Further, the coefficients P2, P4, P6, P8, P10 and E for defining the diffraction lens structure in the equations (C) and (D) are shown in Table 17.

TABLE 17

| | |
|---|---|
| P2 | $-1.608 \times 10^{-1}$ |
| P4 | $-2.586 \times 10^{-7}$ |
| P6 | $-1.104 \times 10^{-10}$ |
| P8 | $9.656 \times 10^{-21}$ |
| P10 | 0 |
| E | 0 |

The focal length of the diffractive lens structure itself is 3986.2 mm at wavelength of 780 nm. The value of m/w is 2.7, which satisfies the condition (1) and the loss of light quantity at the maximum scan angle is 3.1%.

FIGS. 12A, 12B and 12C show aberration characteristics of the optical system of the second embodiment, wherein FIG. 12A shows linearity errors, FIG. 12B shows a curvature of field, and FIG. 12C shows a lateral chromatic aberration.

In the scanning lens 40 of the fifth embodiment, the diffractive lens structure is formed on one surface of the refractive lens element where the width of the incident light beam having the maximum scan angle in a main scanning direction is maximized. Table 18 shows the width WS of the incident light beam on the respective surfaces. The width WS has the maximum value 6.07 on the polygon mirror side surface 42a (#6) of the second lens 42 on which the diffractive lens structure is formed.

TABLE 18

| Surface number | WS |
|---|---|
| #4 | 4.56 |
| #5 | 4.29 |
| #6 | 6.70 |
| #7 | 6.06 |
| #8 | 3.03 |
| #9 | 2.93 |

Further, the polygon mirror side surface 42a of the second lens 42 is the surface where the incident angle of the incident light beam having the maximum scan angle in a main scanning direction is maximized. Table 19 shows the incident angle α(degrees) of the light beam having maximum scan angle on the respective surfaces. The incident angle a has the maximum value 39.72° on the polygon mirror side surface 42a (#6) of the second lens 42 on which the diffractive lens structure is formed.

TABLE 19

| Surface number | — |
|---|---|
| #4 | 14.79° |
| #5 | 8.38° |
| #6 | 39.72° |
| #7 | 5.51° |
| #8 | 18.08° |
| #9 | 9.64° |

The fθ lenses of the embodiment are effective for an optical system of an image reading device that uses a white light illumination and scans an object to read an image. In such a device, the light receiving element such as a photodiode is provided at the position of the light source. The reflection light from the object passes through the fθ lens and is deflected by the polygon mirror to be detected by the light receiving element. Since the fθ lenses of the embodiments can correct the lateral chromatic aberration, the image read by the device is free from the chromatic aberration.

As described above, according to the present invention, since the lateral chromatic aberration of the refractive lens elements is compensated by the diffractive lens structure which is formed on at least one surface of the refractive lens elements constituting a scanning optical system, it is possible to use a scanning lens without increasing the number of lens elements in comparison with a scanning lens for a single beam, and to avoid deterioration of image forming capability due to variation of wavelengths emitted, for example, by a plurality of laser diodes.

The present disclosure relates to subject matter contained in Japanese Patent Application No. HEI 10-176416, filed on Jun. 23, 1998, which is expressly incorporated herein by reference in its entirety.

What is claimed is:

1. A scanning optical system, comprising:

a light source;

a deflector, said deflector deflecting a beam emitted from said light source; and a scanning lens having a positive refractive power, said scanning lens converging the beam deflected by said deflector onto a surface to be scanned, wherein said scanning lens comprises at least one refractive lens element and a diffractive lens structure which is formed on at least one surface of said refractive lens element, said diffractive lens structure compensating a lateral chromatic aberration caused by the refractive power of said scanning lens, said diffractive lens structure satisfying the following relationship;

$$0.3 \leq m/W \leq 4.0$$

where m is a number of periodic patterns of said diffractive lens structure covered by the incident light beam having the maximum scan angle W in degrees.

2. The scanning optical system according to claim 1, wherein said diffractive lens structure satisfies the following condition (2);

$$0.7 \leq m/W \leq 3.0. \quad (2)$$

3. The scanning optical system according to claim 1, wherein said light source emits a plurality of beams which are to be converged on different positions on said surface to be scanned, said deflector deflects all of said plurality of beams.

4. The scanning optical system according to claim 1, wherein said diffractive lens structure has rings concentric about an optical axis of said diffractive lens structure.

5. The scanning optical system according to claim 1, wherein said diffractive lens structure is formed on a rotationally symmetrical lens surface of said scanning lens.

6. The scanning optical system according to claim 1, wherein said diffraction lens structure is formed on a surface, which is closest to said deflector, of said plurality of refractive lens elements.

7. A scanning optical system, comprising:

a light source;

a deflector, said deflector deflecting a beam emitted from said light source; and a scanning lens having positive refractive power, said scanning lens converging the beam deflected by said deflector onto a surface to be scanned, wherein said scanning lens comprises at least one refractive lens element and a diffractive lens structure having a plurality of rings that compensate a lateral chromatic aberration caused by the refractive power of said scanning lens, said diffractive lens structure being formed on one surface of said at least one refractive lens element where the width of the incident light beam having the maximum scan angle in a main scanning direction is maximized, whereby a loss of light at a boundary between adjacent rings is reduced by a step between adjacent rings.

8. A scanning optical system, comprising:

a light source;

a deflector, said deflector deflecting a beam emitted from said light source; and a scanning lens having positive refractive power that converges the beam deflected by said deflector onto a surface to be scanned, wherein said scanning lens comprises at least one refractive lens element and a diffractive lens structure having a plurality of rings that compensate a lateral chromatic aberration caused by the refractive power of said scanning lens, said diffractive lens structure being formed on the surface that is closest to said deflector of the surfaces having positive refractive power whereby a loss of light at a boundary between adjacent rings is reduced by a step between adjacent rings.

9. A scanning optical system, comprising:

a light source;

a deflector, said deflector deflecting a beam emitted from said light source; and a scanning lens having positive refractive power that converges the beam deflected by said deflector onto a surface to be scanned, wherein said scanning lens comprises at least one refractive lens element and a diffractive lens structure having a plurality of rings that compensates a lateral chromatic aberration caused by the refractive power of said scanning lens, said diffractive lens structure being formed on one surface of said refractive lens element where the incident angle of the incident light beam having the maximum scan angle in a main scanning direction is maximized, whereby a loss of light at a boundary between adjacent rings is reduced be a step between adjacent rings.

10. The scanning optical system according to claim 7, wherein said light source emits a plurality of beams which are converged on different positions on said surface to be scanned, and said deflector deflects each of said plurality of beams.

11. The scanning optical system according to claim 7, wherein said diffractive lens structure has rings concentric about an optical axis of said diffractive lens structure.

12. The scanning system according to claim 7, a step between adjacent rings comprising a curved surface.

13. The scanning optical system according to claim 8, wherein said light source emits a plurality of beams which are converged on different positions on said surface to be scanned, and said deflector deflects each of said plurality of beams.

14. The scanning optical system according to claim 8, wherein said diffractive lens structure has rings concentric about an optical axis of said diffractive lens structure.

15. The scanning system according to claim 8, a step between adjacent rings comprising a curved surface.

16. The scanning optical system according to claim 9, wherein said light source emits a plurality of beams which are converged on different positions on said surface to be scanned, and said deflector deflects each of said plurality of beams.

17. The scanning optical system according to claim 9, wherein said diffractive lens structure has rings concentric about an optical axis of said diffractive lens structure.

18. The scanning system according to claim 9, a step between adjacent rings comprising a curved surface.

19. A scanning optical system, comprising:

a light source;

a deflector, said deflector deflecting a beam emitted from said light source; and a scanning lens having positive refractive power that converges the beam deflected by said deflector onto a surface to be scanned, wherein said scanning lens comprises at least one refractive lens element and a diffractive lens structure including a plurality of rings that compensate a lateral chromatic aberration caused by the refractive power of said scanning lens, said diffractive lens structure being formed on the surface having non-positive power that is closer to said deflector than said closest surface having positive power, whereby a loss of light at a boundary between adjacent rings is reduced by a step between adjacent rings.

20. The scanning optical system according to claim 19, wherein said light source emits a plurality of beams which are converged on different positions on said surface to be scanned, and said deflector deflects all of said plurality of beams.

21. The scanning optical system according to claim 19, wherein said diffractive lens structure has rings concentric about an optical axis of said diffractive lens structure.

22. The scanning system according to claim 19, a step between adjacent rings comprising a curved surface.

* * * * *